US010348150B2

(12) United States Patent
Miyamoto et al.

(10) Patent No.: US 10,348,150 B2
(45) Date of Patent: Jul. 9, 2019

(54) ROTATING ELECTRIC MACHINE STATOR (71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Tomohiko Miyamoto, Nagakute (JP); Takeshi Tsuji, Anjo (JP); Dai Nakajima, Anjo (JP)

(73) Assignees: Toyota Jidosha Kabushiki Kaisha, Toyota-shi, Aichi-ken (JP); Aisin AW Co., Ltd., Anjo-shi, Aichi-ken (JP)

( * ) Notice: Subject to any disclaimer, the term of this patent is extended or adjusted under 35 U.S.C. 154(b) by 100 days.

(21) Appl. No.: 15/110,993

(22) PCT Filed: Jan. 19, 2015

(86) PCT No.: PCT/IB2015/000040
§ 371 (c)(1),
(2) Date: Jul. 12, 2016

(87) PCT Pub. No.: WO2015/110892
PCT Pub. Date: Jul. 30, 2015

(65) Prior Publication Data
US 2016/0336828 A1   Nov. 17, 2016

(30) Foreign Application Priority Data
Jan. 21, 2014   (JP) ................................. 2014-008486

(51) Int. Cl.
*H02K 3/18*   (2006.01)
*H02K 3/32*   (2006.01)
*H02K 3/52*   (2006.01)

(52) U.S. Cl.
CPC ............... *H02K 3/325* (2013.01); *H02K 3/18* (2013.01); *H02K 3/522* (2013.01); *H02K 2203/12* (2013.01)

(58) Field of Classification Search
CPC .. H02K 3/32; H02K 3/34; H02K 3/52; H02K 2203/12
(Continued)

(56) References Cited

U.S. PATENT DOCUMENTS

2010/0066198 A1   3/2010 Fubuki et al.
2012/0256511 A1 * 10/2012 Haruno ................. H02K 3/345
                                                                    310/215

FOREIGN PATENT DOCUMENTS

JP   2004350450 A  * 12/2004
JP   2007244115 A  *  9/2007
(Continued)

OTHER PUBLICATIONS

Machine translation of JP 2007-244115A.*
Machine translation of JP 2004-350450 A retrived from ESPACENET(2004).*

Primary Examiner — John K Kim
Assistant Examiner — Minki Chang
(74) Attorney, Agent, or Firm — Finnegan, Henderson, Farabow, Garrett & Dunner, LLP (57) ABSTRACT A stator of a rotating electric machine includes a stator core, a plurality of insulators and a plurality of concentrated winding coils. The stator core includes an annular yoke and a plurality of teeth. The insulators are located along outer peripheral wall surfaces of the teeth. Each of the insulators includes a plurality of first surfaces and a plurality of second surfaces. The second surfaces connect the first surfaces. The coils are fitted on the teeth on which the insulators have been placed from a radially inner side thereof. The first surfaces (Continued)

of each of the insulators are in contact with inner peripheral surfaces of the coil that is placed on the outer periphery of the insulator.

4 Claims, 7 Drawing Sheets

(58) Field of Classification Search
USPC .......................................................... 310/201
See application file for complete search history.

(56) References Cited

FOREIGN PATENT DOCUMENTS

| JP | 2008-220093 | 9/2008 |
| JP | 2012-222944 | 11/2012 |
| JP | 2012-257409 A | 12/2012 |
| JP | 2013-162565 | 8/2013 |
| JP | 2013-223288 | 10/2013 |

* cited by examiner

ROTATING ELECTRIC MACHINE STATOR

BACKGROUND OF THE INVENTION

1. Field of the Invention

The present invention relates to a rotating electric machine stator, and more particularly, to a rotating electric machine stator in which coils are wound via insulators.

2. Description of Related Art

When coils of a rectangular wire are wound via insulators, the insulators are preferably as thin as possible in order to improve the space factor of the windings as long as the insulating performance of the insulators is ensured.

Japanese Patent Application Publication No. 2012-222944 (JP 2012-222944 A) discloses a stator in which rectangular wires are wound around teeth that protrude inward from a yoke portion of a stator core via insulators. In the stator, the thickness of the insulators is varied depending on the relative positional relationship between the rectangular wires and the teeth.

It is stated in Japanese Patent Application Publication No. 2013-162565 (JP 2013-162565 A) that concentrated winding coils that have been preliminarily formed by winding coil windings with a rectangular cross-section using a winding mold are fitted around teeth of a stator core from the radially inner side thereof.

It is stated in Japanese Patent Application Publication No. 2008-220093 (JP 2008-220093 A) that, when concentrated winding coils are sequentially fitted on teeth that protrude radially inward from a yoke portion of an integrated stator core, a coil cannot be fitted onto the last tooth unless a special measure is taken because coils have been already placed in the slots on both sides of the tooth. It is, therefore, disclosed that the coil is deformed in a hollow state before it is installed in order to improve the space factor without using a dividable core.

In connection with JP 2008-220093 A, it is pointed out in Japanese Patent Application Publication No. 2013-223288 (JP 2013-223288 A) that, when multilayer multistage concentrated winding coils are used and the coil to be fitted on the last tooth is deformed, the deformation causes gaps or interference between the multilayered windings. It is stated in the document that predetermined gaps are preliminarily provided between the windings of the multilayer coils in order to prevent interference therebetween.

In order to improve the space factor of coils while ensuring the insulating performance of insulators, the use of stepped insulators as described in JP 2012-222944 A is preferred. In this case, when concentrated winding coils are used in an integrated stator, the coil that is to be installed last must be deformed before it is installed as described in JP 2008-220093 A. At this time, when stepped insulators are used, the corner portions of the deformed coil may interfere with the steps of the insulator. Thus, because the coil must be installed carefully in order to avoid the interference, the coil insertability is poor. When the width of the teeth is reduced in order to improve the coil insertability, the space factor of the coils decreases, which can cause a decrease in performance of the rotating electric machine or other problems.

SUMMARY OF THE INVENTION

The present invention provides a rotating electric machine stator in which the coil insertability can be improved with the insulating performance of stepped insulators ensured.

A rotating electric machine stator according to the present invention comprising a stator core, a plurality of insulators and a plurality of concentrated winding coils. The stator core includes an annular yoke and teeth. The teeth protrude radially inward from the yoke, the teeth are arranged circumferentially, and the teeth include a first tooth and a second tooth that is adjacent to the first tooth. A slot is defined between the first tooth and the second tooth. The insulators are located along outer peripheral wall surfaces of the teeth, and each insulator includes a plurality of first surfaces and a plurality of second surfaces. The second surfaces connect the first surfaces. The plurality of concentrated winding coils is fitted on each of the teeth on which the insulator has been placed from a radially inner side. The first surfaces are in contact with inner peripheral surfaces of the coil that is placed on the outer periphery of the insulator.

According to the rotating electric machine stator with the above configuration, each insulator has a plurality of first surfaces that is in contact with inner peripheral surfaces of the coil that is placed on the outer periphery of the insulator. In addition, each insulator has a plurality of second surfaces that connects the first surfaces. With the stator that has the configuration as described above, even when a coil must be inserted into narrow slots, the second surfaces help to prevent interference between the coil and the insulator. Examples of the case where slots are narrow include the case where coils have been fitted on all the teeth except the last one and the slots on both sides of the last tooth are therefore narrow. In addition, because the inner peripheral surfaces of each coil are in contact only with the first surfaces, the insulating performance of the insulators is not adversely affected even when the second surfaces are provided. Thus, the coil insertability can be improved with the insulating performance of the insulators ensured.

In the rotating electric machine stator according to the present invention, the second surfaces of the insulator that is placed on the first tooth may be parallel to outer peripheral surfaces of the coil that is placed on the second tooth.

In the rotating electric machine stator according to the present invention, a first inclination angle may be set based on a second inclination angle. The first inclination angle is the inclination angle between the first surfaces and the second surfaces of the insulator that is placed on the first tooth. The second inclination angle is the inclination angle between a center line of the first tooth and a center line of the second tooth. The center line of the first tooth and the center line of the second tooth are lines that extend radially.

In the rotating electric machine stator according to the present invention, the inner peripheral surface of one turn of the coil may be partially in contact with the first surface and the other part of the inner peripheral surface may be apart from the second surface.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the present invention is described below in detail with reference to the drawings. The dimensions, shapes, materials and so on that are described below are shown for illustrative purposes and may be changed as needed depending on the design of the rotating electric machine stator and so on. In addition, in the following, the same elements are designated in all the drawings by the same reference numerals and redundant description is not repeated.

Figure 1:
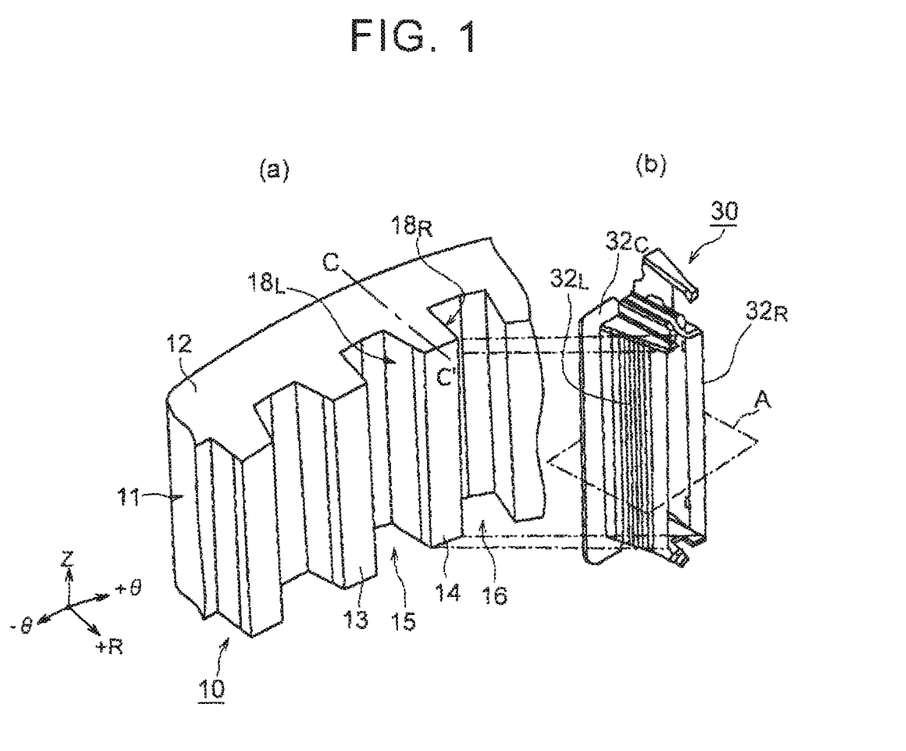
FIG. 1 is a perspective view that illustrates the relationship between a stator core and an insulator in a rotating electric machine stator according to an embodiment of the present invention.
Figure 2:
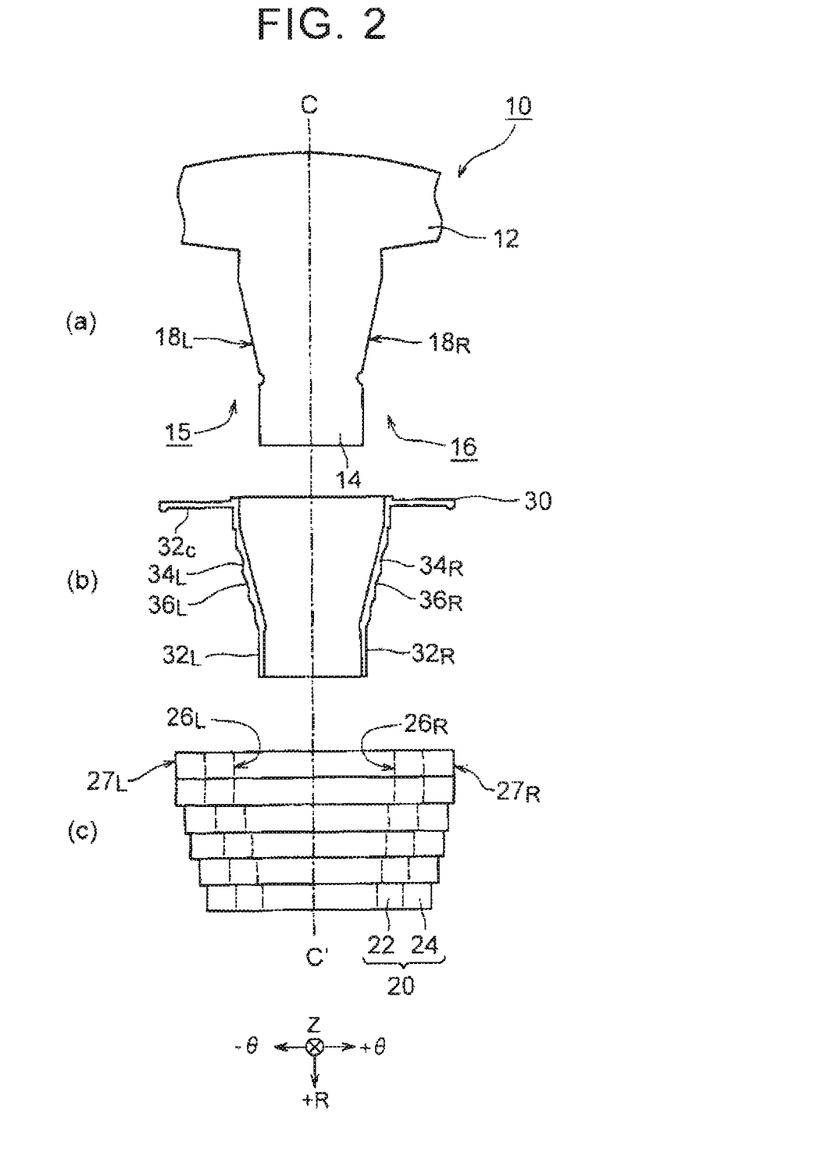
FIG. 2 is a diagram that illustrates the relationship among a tooth, an insulator and a concentrated winding coil in the rotating electric machine stator according to an embodiment of the present invention.

FIG. 1 and FIG. 2 are diagrams that illustrate the configuration of a rotating electric machine stator 10 that is used in a rotating electric machine that is mounted in a vehicle. In the following, the rotating electric machine stator 10 is referred to as "stator 10" unless otherwise stated. In FIG. 1, (a) is a perspective view of a stator core 11, and (b) is a perspective view of an insulator 30 that is fitted on each tooth 14 of the stator core 11 that is shown in (a). In FIG. 2, (a) is a top view of the tooth 14, (b) is a cross-sectional view of the insulator 30 that is taken along the plane A in FIG. 1, and (c) is a top view of a concentrated winding coil 20 that is fitted on each tooth 14 via the insulator 30. In FIGS. 1 and 2, the circumferential direction θ, radial direction R and height direction Z of the stator 10 are shown. +R means that the direction is radially inward, and +θ means that the direction is from left to right on the plane of the drawings. The same also applies to the other drawings.

The rotating electric machine in which the stator 10 is used is a motor generator that functions as an electric motor when the vehicle is driven and as a power generator when the vehicle is braked and is a three-phase synchronous rotating electric machine. The rotating electric machine is constituted of a stator, i.e., the stator 10 that is shown in FIG. 1, and a rotor, i.e., an annular rotor that is located radially inside the stator 10 with a predetermined clearance therebetween. In FIG. 1, the illustration of the rotor is omitted.

The stator 10 has a stator core 11 that has an annular yoke portion 12, a plurality of teeth 13 and 14 that is circumferentially arranged and protrudes radially inward from the yoke portion 12 and a plurality of slots 15 and 16 as spaces between the teeth 13 and 14, insulators 30 that are placed along the outer peripheral wall surfaces of the teeth 13 and 14, and concentrated winding coils 20 that are fitted on the teeth 13 and 14 from the radially inner side thereof via the insulators 30.

The yoke portion 12 forms an outer peripheral part of the stator core 11 and has an annular shape. The teeth 13 and 14 and the slots 15 and 16 are alternately arranged circumferentially along the radially inside face of the yoke portion 12. The teeth 13 and 14 are protrusions around which coils 20 are wound to form magnetic poles. Each of the teeth 13 and 14 is symmetric with respect to a center line C-C' thereof that extends in the R direction, and is tapered in the +R direction. The center lines C-C' of two adjacent teeth 13 and 14 are inclined at an angle of $\theta_0$=(360/the number of teeth) with respect to each other. For example, when the stator core 11 has ten teeth, $\theta_0$=36 degrees.

In FIG. 1(a), the two side wall surfaces of the teeth 14 in the θ direction are discriminated by referring to the side wall surface that faces the slot 15 and the side wall surface that faces the slot 16 as "side wall surface $18_L$" and "side wall surface $18_R$," respectively. An insulator 30 is placed to cover the side wall surfaces $18_L$ and $18_R$.

As the stator core 11, a laminate of a plurality of annular thin magnetic plates, each of which includes teeth 13 and 14 and slots 15 and 16 and has a predetermined shape, is used. As the magnetic thin plates, magnetic steel sheets may be used. Instead of a laminate of magnetic thin plates, a compact that is obtained by molding a magnetic powder into a predetermined shape may be used.

Each concentrated winding coil 20 is formed by winding a conductor with an insulating film a predetermined number of turns into a predetermined number of layers using a winding mold that has a generally trapezoid cross-section shape corresponding to the cross-sectional shape of the teeth 13 and 14 and removing the resulting wound body from the winding mold. In the example that is shown in FIG. 2(c), a six-turn internal winding 22 and a six-turn external winding 24 that has been wound along the outer peripheral surface of the internal winding 22 into a layer are shown. The internal winding 22 has coil inner peripheral surfaces $26_L$ and $26_R$ that are placed in the slots 15 and 16, respectively, and are placed along outer peripheral wall surfaces of the insulator 30.

As shown in FIG. 2, when an insulator 30 is fitted on a tooth 14 and a coil 20 is placed around the outer periphery of the insulator 30, the center line of the coil 20 coincides with the center line C-C' of the tooth 14. Thus, the coil inner peripheral surfaces $26_L$ and $26_R$ of a coil 20 are wall surfaces that are parallel to the center line C-C' of the tooth 14 on which the coil 20 is wound.

As for the conductive wire with an insulating film, copper wires, copper-tin alloy wires or silver plated copper-tin alloy wires, for example, may be used as element wires of the conductive wire. As the element wires, rectangular wires with a rectangular cross-section are used. As the insulating film, a polyamideimide enamel film is used. Instead of a polyamideimide enamel film, a polyester imide, polyimide, polyester, formal or the like may be used.θθθ

The insulators 30 are insulating members that electrically insulate the connection between the stator core 11 and the coils 20. As shown in FIG. 1, the insulators 30 are flanged frame-like members that are fitted one each on the teeth 13 and 14. Flanges $32_C$ are extended portions that correspond to the inner wall surfaces of the bottoms of the slots 15 and 16. Among the side walls that form the frame-like structure, the side wall corresponding to the side wall surface $18_L$ of the tooth 14 is referred to as "side wall $32_L$," and the side wall corresponding to the side wall surface $18_R$ of the tooth 14 is referred to as "side wall $32_R$." Each of the side walls $32_L$ and $32_R$ is provided with a stepped surface that has steps corresponding to the turns of a coil 20.

The stepped surface is constituted of two types of wall surfaces that are inclined with respect to each other. The two types of wall surfaces are coil contact surfaces $34_L$ and $34_R$ and taper surfaces $36_L$ and $36_R$ that connect coil contact surfaces adjacent to each other in the R direction. The coil contact surfaces $34_L$ and the taper surfaces $36_L$ are arranged alternately and radially from outside to inside in the R direction on the side wall $32_L$, and the coil contact surfaces $34_R$ and the taper surfaces $36_R$ are arranged alternately and radially from outside to inside in the R direction on the side wall $32_R$.

The coil contact surfaces $34_L$ and $34_R$ that form parts of the stepped surfaces are wall surfaces which are parallel to the center line of each insulator 30 that extends in the R direction. When an insulator 30 is fitted on a tooth 14 and a coil 20 is inserted into the slots 15 and 16 along the outer periphery of the insulator 30, the coil contact surfaces $34_L$ and $34_R$ extend parallel to the center line C-C' of the tooth 14 and to the coil inner peripheral surfaces $26_L$ and $26_R$ of the coil 20. Thus, the coil inner peripheral surfaces $26_L$ and $26_R$ come into contact with the coil contact surfaces $34_L$ and $34_R$, respectively. This is the reason why the coil contact surfaces $34_L$ and $34_R$ are called so.

The taper surfaces $36_L$ and $36_R$ that form parts of the stepped surfaces are wall surfaces that connect coil contact surfaces adjacent to each other in the R direction. After an insulator 30 has been fitted on a tooth 14 and a coil 20 has been inserted into the slots 15 and 16 along the outer periphery of the insulator 30, the taper surfaces $36_L$ and $36_R$ are not in contact with but apart from the coil inner peripheral surfaces $26_L$ and $26_R$, respectively, of the coil 20. The inclination angle of the taper surfaces $36_L$ and $36_R$ with respect to the coil contact surfaces $34_L$ and $34_R$ can be determined in view of the insertability of a coil 20 into the slots 15 and 16. The determination of the inclination angle in view of the insertability is described in detail later with reference to FIG. 7.

FIG. 3 to FIG. 6 are diagrams that illustrate the procedure for sequentially installing the concentrated winding coils 20 after fitting the insulators 30 on the teeth 13 and 14 in the stator 10. These diagrams are all top views. In the following, two teeth 13 and 14 are used as representatives of the teeth as parts of the stator 10, and the slots 15 and 16 on both side of the tooth 14 are used as representatives of the slots. Also, the insulators 30 and the coils 20 are respectively designated by the same reference numerals without distinction.

Figure 3:
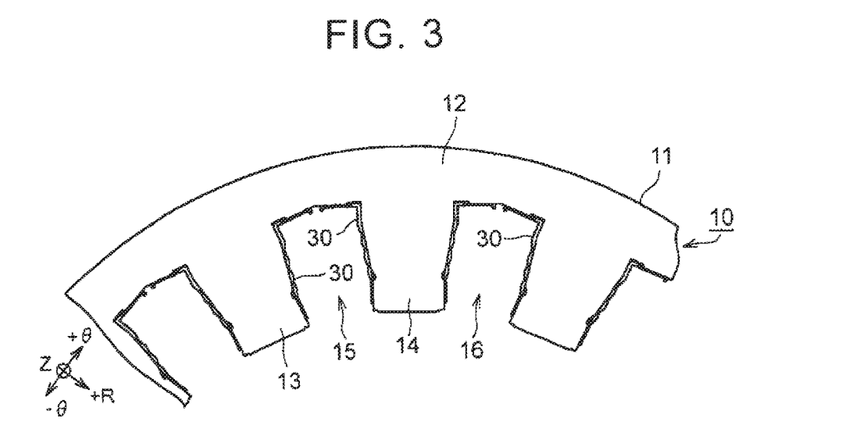
FIG. 3 is a diagram that illustrates the state in which insulators have been fitted on teeth in the rotating electric machine stator according to an embodiment of the present invention.

FIG. 3 is a diagram that illustrates a state where the insulators 30 have been fitted on the teeth 13 and 14. As shown in FIG. 3, a left side portion of one insulator and a right side portion of another insulator are located in one slot.

Figure 4:
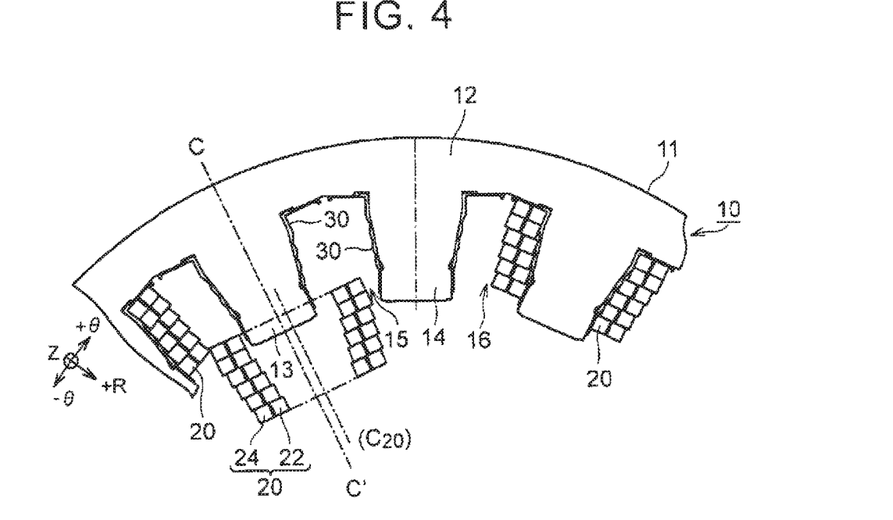
FIG. 4 is a diagram that illustrates the moment when a concentrated winding coil is fitted on a tooth in the rotating electric machine stator according to an embodiment of the present invention.

FIG. 4 is a diagram that illustrates a state where a coil 20 is being fitted on the tooth 13 as the insulators 30 have fitted on all the teeth and coils 20 have been sequentially inserted into the slots 15 on both sides of all the teeth except two teeth 13 and 14. A coil 20 has been already fitted on the tooth on the left side of the tooth 13 but no coil 20 has been fitted on the tooth on the right side of the tooth 13, namely, the tooth 14. In other words, no coil 20 has been placed in the slot 15 on the right side of the tooth 13. Thus, when the center line $C_{20}$ of a concentrated winding coil 20 is shifted toward the slot 15 with respect to the center line C-C' of the tooth 13, the coil 20 can be fitted on the tooth 13 with its shape maintained even if the coil 20 is not deformed.

Figure 5:
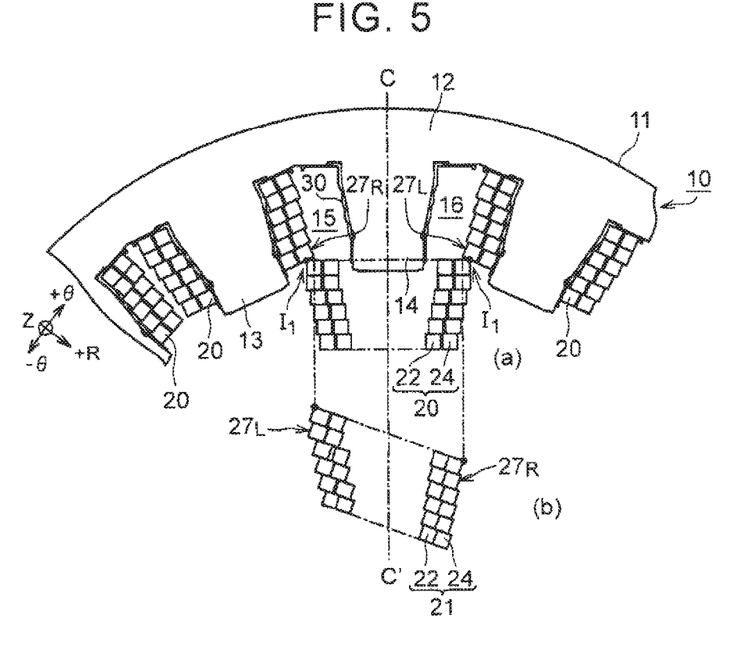
FIG. 5 is a diagram that illustrates the last tooth on which a concentrated winding coil must be fitted in the rotating electric machine stator according to an embodiment of the present invention, wherein (a) illustrates the interference between coils that have been already installed and the last coil and (b) illustrates a coil that is deformed to avoid the interference with other coils.

FIG. 5 is a diagram that illustrates a state where a coil 20 is being fitted on the tooth 14 as the process that is shown in FIG. 4 has been completed, i.e., coils 20 have been fitted on all the teeth except the tooth 14. Because coils 20 have been fitted on the teeth on right and left sides of the tooth 13, a coil 20 lies in both the slot 15 on the left side of the tooth 14 and the slot 16 on the right side of the tooth 14. Thus, the coil 20 that is to be installed now cannot be directly inserted into the slots 15 and 16 because the corner portions at both ends of the long side of its generally trapezoid cross-sectional shape interfere with the coils 20 which have been already installed as long as the coil 20 is maintained in its concentrically wound shape. This situation is shown as an interference state $I_1$ in FIG. 5(a).

FIG. 5(b) is a diagram that illustrates a coil 21 that is deformed to avoid the interference state $I_1$ from occurring. The deformation of the coil 21 can be achieved as described below, for example. First, the coil 21 is inclined with respect to the center line C-C' of the tooth 14 until the coil outer peripheral surfaces $27_L$ of the coil 21 are parallel to the coil outer peripheral surfaces $27_R$ of the coil 20 that has been already placed in the slot 15. At this point, the coil 21 has not been deformed yet. Then, the coil 21 is deformed so that the coil outer peripheral surfaces $27_R$ of the coil 21 in this state will not interfere with the coil outer peripheral surfaces $27_L$ of the coil 20 that has been already placed in the slot 16. The coil 21 is deformed within its elastic deformation range.

Figure 6:
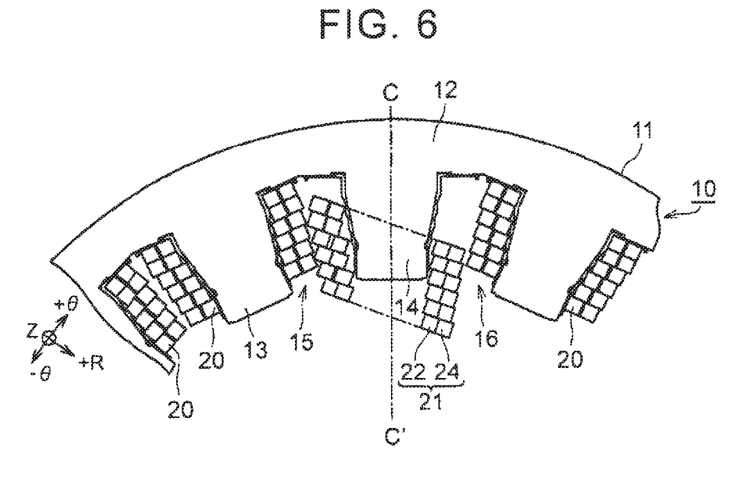
FIG. 6 is a diagram that illustrates how the deformed coil is fitted on the last tooth in the rotating electric machine stator according to an embodiment of the present invention.

The above deformation process is merely an example. In short, what is needed is to deform the coil 21 to be installed so that it will not interfere with either of the two coils 20 that have been already installed. FIG. 6 is a diagram that illustrates a state where a deformed coil 21 is being inserted into the slots 15 and 16. When the insertion process is continued until the windings that form the coil 21 are located in place in the slots 15 and 16, the external force that has been applied to, deform the coil 21 disappears and the coil 21 is returned to its original shape by the elasticity of the windings. As a result, a coil 20 that has a shape before deformation is fitted on the tooth 14.

Figure 7:
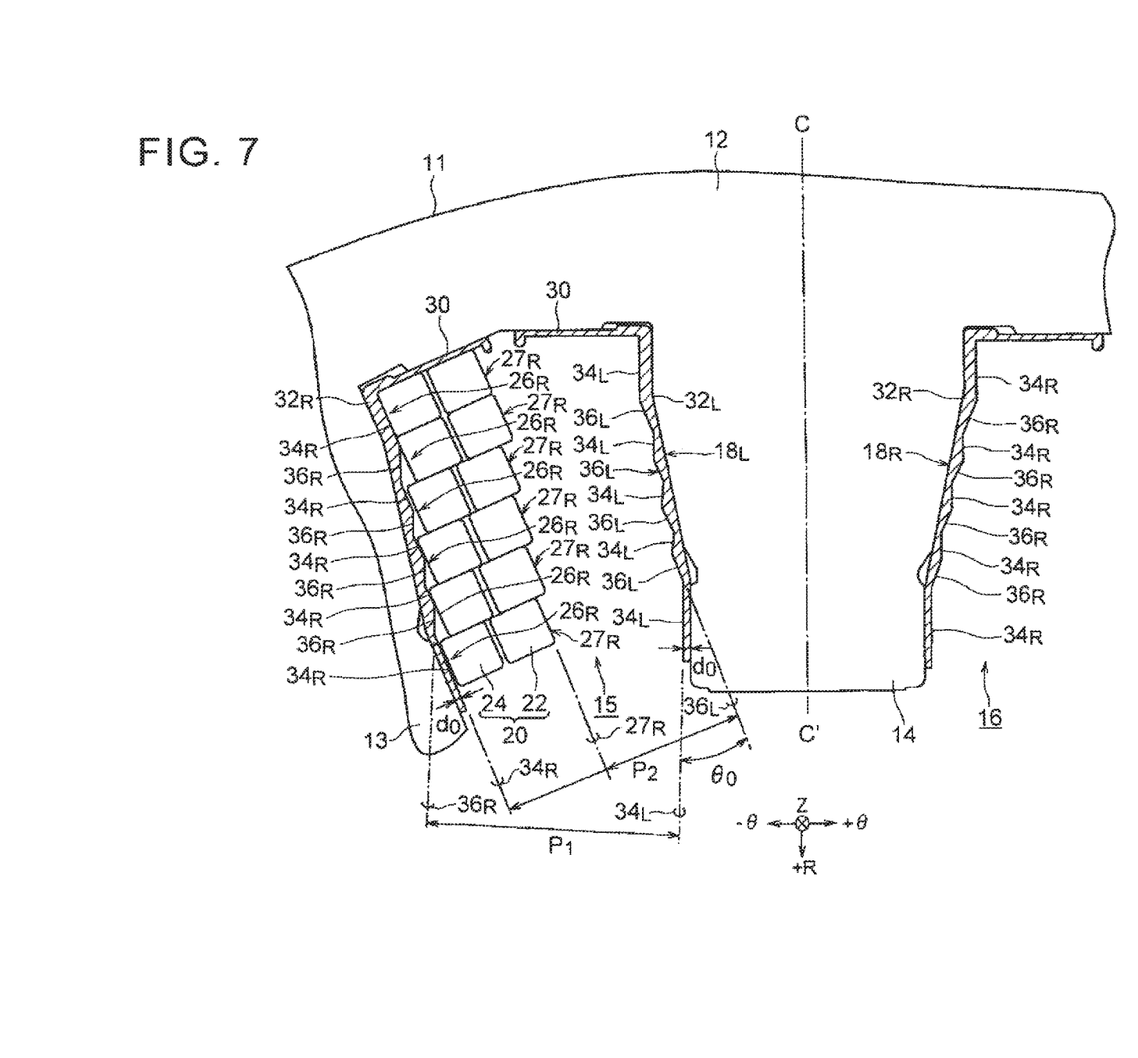
FIG. 7 is an enlarged view that illustrates the relationship among teeth, insulators and a concentrated winding coil in the rotating electric machine stator according to an embodiment of the present invention.

FIG. 7 is an enlarged view of the state that is shown in FIG. 5, which illustrates the relationship among the teeth 13 and 14, the insulators 30 and a coil 20 before the last coil 20 is fitted on the tooth 14. Here, the state where an insulator 30 has been fitted on the tooth 14 is shown. In addition, the relationship between the coil inner peripheral surfaces $26_R$ of the coil 20 that has been fitted on the tooth 13 via an insulator 30 and the coil contact surfaces $34_R$ and taper surfaces $36_R$ of the side wall $32_R$ of the insulator 30 is shown.

The insulator 30 that has been fitted on the tooth 14 is described using the right-hand side part of FIG. 7. The side wall $32_L$ of the insulator 30 is placed in contact with the side wall surface $18_L$ of the tooth 14, and the side wall $32_R$ of the insulator 30 is placed in contact with the side wall surface $18_R$ of the tooth 14. The coil contact surfaces $34_L$ and the taper surfaces $36_L$ are arranged alternately and radially from outside to inside in the R direction on the slot 15 side face of the side wall $32_L$ of the insulator 30. In other words, a coil contact surface $34_L$, a taper surface $36_L$, a coil contact surface $34_L$, a taper surface $36_L$, a coil contact surface $34_L$, a taper surface $36_L$, a coil contact surface $34_L$, a taper surface $36_L$ and a coil contact surface $34_L$ are arranged sequentially and radially from outside to inside.

Similarly, the coil contact surfaces $34_R$ and the taper surfaces $36_R$ are arranged alternately and radially from outside to inside in the R direction on the slot 16 side face of the side wall $32_R$ of the insulator 30. In other words, a coil contact surface $34_R$, a taper surface $36_R$, a coil contact surface $34_R$, a taper surface $36_R$, a coil contact surface $34_R$, a taper surface $36_R$, a coil contact surface $34_R$, a taper surface $36_R$ and a coil contact surface $34_R$ are arranged sequentially and radially from outside to inside.

In this way, the coil contact surfaces $34_L$ and $34_R$ or the taper surfaces $36_L$ and $36_R$ are provided on the same position in the R direction on the side walls $32_L$ and $32_R$ of the insulator 30.

Next, the state after a coil 20 has been fitted on the tooth 13 via an insulator 30 is described using the left-hand side part of FIG. 7. After the coil 20 has been fitted on the insulator 30, the coil inner peripheral surfaces $26_R$ are in contact with the coil contact surfaces $34_R$ of the insulator 30 but are not in contact with, namely, apart from the taper surfaces $36_R$ of the insulator 30.

When attention is given to two insulators 30 that are opposed to each other in one slot 15, the taper surfaces $36_R$ of the side wall $32_R$ of the insulator 30 that is fitted on the tooth 13 and the coil contact surface $34_L$ of the side wall $32_L$ of the insulator 30 that is fitted on the tooth 14 are in a parallel relationship $P_1$ with each other. This parallel relationship $P_1$ is parallel to the center line C-C' of the tooth 14 that extends in the R direction.

The coil contact surfaces $34_R$ of the side wall $32_R$ of the insulator 30 that is fitted on the tooth 13 are in a parallel relationship $P_2$ with the coil outer peripheral surfaces $27_R$ of the coil 20 that is fitted on the tooth 13. In addition, the taper surfaces $36_L$ of the side wall $32_L$ of the insulator 30 that is fitted on the tooth 14 are also in a parallel relationship $P_2$ with the coil outer peripheral surfaces $27_R$ of the coil 20 that is fitted on the tooth 13. The parallel relationship $P_2$ is set to improve the insertability of the deformed coil 21 when the coil 21 is fitted on the tooth 14 as shown in FIG. 6.

The parallel relationship $P_2$ indicates that the coil contact surfaces $34_R$ of the side wall $32_R$ of the insulator 30 that is fitted on the tooth 13 and the taper surfaces $36_L$ of the side wall $32_L$ of the insulator 30 that is fitted on the tooth 14 are parallel to each other.

These relationships are summarized using FIG. 7. The coil contact surfaces $34_R$ of the side wall $32_R$ of the insulator 30 that is fitted on the tooth 13 and the taper surfaces $36_L$ of the side wall $32_L$ of the insulator 30 that is fitted on the tooth 14 are in a parallel relationship $P_2$ with each other. The taper surfaces $36_R$ of the side wall $32_R$ of the insulator 30 that is fitted on the tooth 13 and the coil contact surfaces $34_L$ of the side wall $32_L$ of the insulator 30 that is fitted on the tooth 14 are in a parallel relationship $P_1$. Thus, the inclination angle $\theta_0$ of the parallel relationship $P_2$ with respect to the parallel relationship $P_1$ is equal to the angle between the center line C-C' of the tooth 13 and the center line C-C' of the tooth 14, which is adjacent to the tooth 13.

In other words, the insulator 30 that is fitted on the tooth 14 has coil contact surfaces $34_L$ and $34_R$ that are in contact with the coil inner peripheral surfaces $26_L$ and $26_R$, respectively, of the concentrated winding coil 20 that is fitted on the tooth 14.

And the insulator 30 the insulator 30 that is fitted on the tooth 14 has taper surfaces $36_L$ and $36_R$ which are parallel to the outer peripheral surfaces $27_R$ of the other concentrated winding coil that is placed in the slot 15 and the outer peripheral surfaces $27_L$ of the other concentrated winding coil that is placed in the slot 16, respectively. The taper surfaces $36_L$ and $36_R$ are inclined at an inclination angle $\theta_0$ with respect to the coil contact surfaces $34_L$ and $34_R$, respectively.

Figure 8:
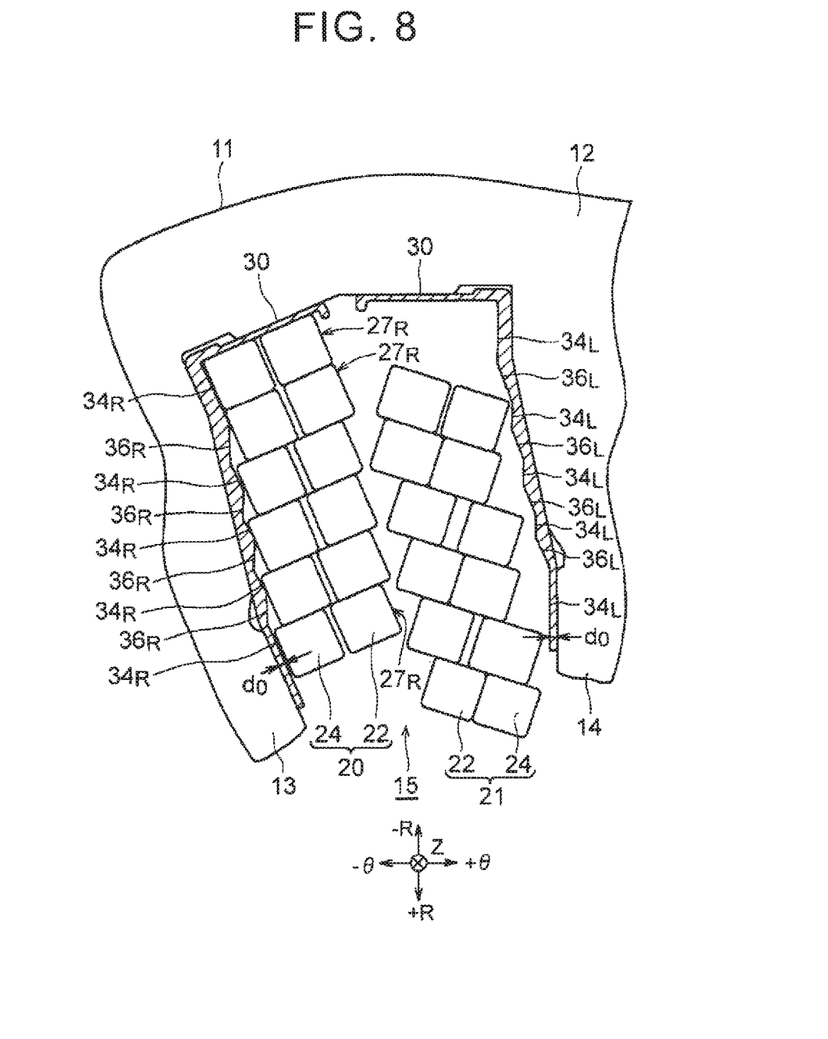
FIG. 8 is a diagram that illustrates the coil insertability in the rotating electric machine stator according to an embodiment of the present invention.
Figure 9:
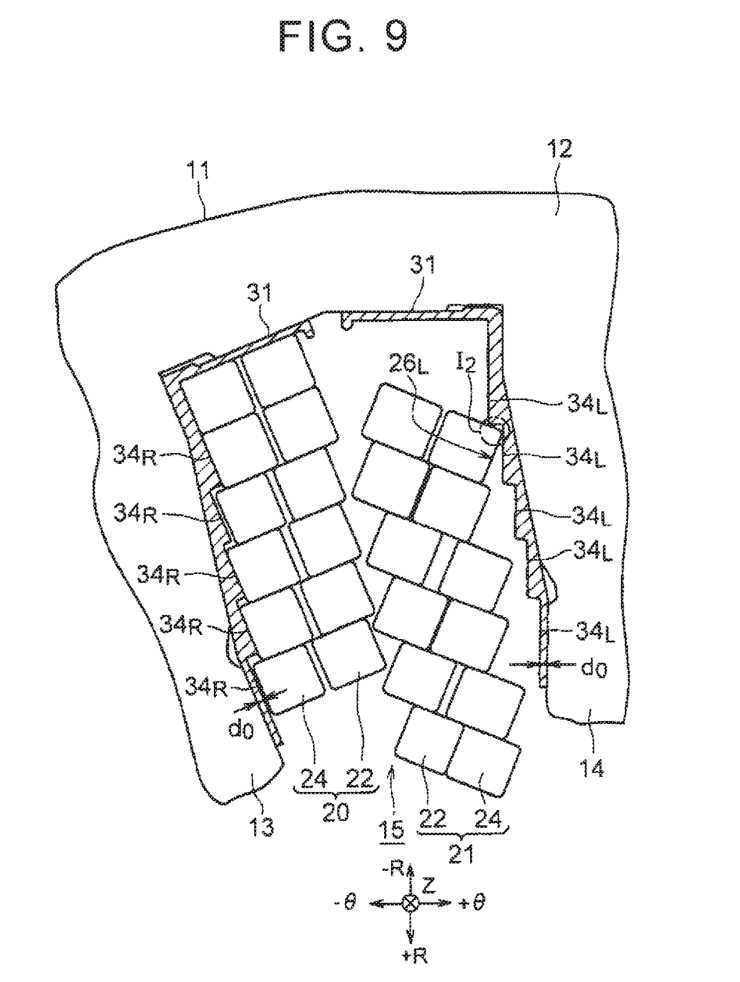
FIG. 9 is a diagram that illustrates, for comparison, the coil insertability in a case where stepped insulators according to a related art are used.

The effect of the rotating electric machine stator 10 as described above is described with reference to FIG. 8 and FIG. 9. FIG. 8 and FIG. 9 are provided for comparison of the coil insertability at the time when coils 20 are fitted onto teeth 13 and 14 that are opposed to each other in a slot 15 of the stator core 11. FIG. 8 is a diagram that shows a case in which the insulator 30 according to the present invention is used, and FIG. 9 is a diagram that shows a case in which a stepped insulator 31 according to a related art is used. In these drawings, a coil 20 has been already fitted on the tooth 13. As for the tooth 14, a coil 21 is going to be inserted into the slots 15 and 16 via an insulator 31 or insulator 30 according to the procedure that is shown in FIGS. 5 and 6.

In FIG. 8, the insulators 30 according to the present invention have been fitted on the teeth 13 and 14. The insulator 30 according to the present invention has a structure in which the coil contact surfaces $34_L$ and $34_R$ are connected by the taper surfaces $36_L$ and $36_R$, respectively, in the R direction. The minimum thickness $d_0$ of the insulator 30 is set to a value that can ensure the insulating performance. While the insulator 30 has a smaller thickness at the portions that have the taper surface $36_L$ or $36_R$, the insulating performance of the insulator 30 is not adversely affected because the coil inner peripheral surfaces $26_L$ and $26_R$ are apart from the taper surfaces $36_L$ and $36_R$, respectively.

Each insulator 30 has the taper surfaces $36_L$ and $36_R$ adjacent to the coil contact surfaces $34_L$ and $34_R$ in the R direction, and, as described with reference to FIG. 8, the taper surfaces $36_L$ of the insulator 30 that is fitted on the tooth 14 are parallel to the coil outer peripheral surfaces $27_R$ of the coil 20 that is fitted on the tooth 13. Thus, when a deformed coil 21 is moved radially outward into the slot 15 to fit the coil 21 on the tooth 14, the coil 21 can be smoothly moved along the taper surfaces $36_L$ because the insulator 30 does not have steps that have a right-angled corer. In addition, even when the coil 21 is moved toward the adjacent coil 20 in order to move the coil 21 along the taper surfaces $36_L$, no interference occurs with the adjacent coil 20 because the taper surfaces $36_L$ are parallel to the coil outer peripheral surfaces $27_R$ of the adjacent coil 20.

In FIG. 9, the insulators 31 according to a related art have been fitted on the teeth 13 and 14. Unlike the insulator 30 according to the present invention, the insulator 31 according to a related art does not have the taper surfaces $36_L$ and $36_R$ and has a stepped structure that is constituted only of coil contact surfaces $34_L$ and $34_R$. For example, the insulator 31 that is fitted on the tooth 14 has right-angled steps between the coil contact surfaces. $34_L$ in the slot 15. The minimum thickness $d_0$ of the insulator 31 is set to a value that can ensure the insulating performance.

In this case, when a deformed coil 21 is moved radially outward in the slot 15 to fit the coil 21 on the tooth 14, the corner portion at one end of a coil inner peripheral surface $26_L$ of the coil 21 may interfere with the right-angled corner of a step of the insulator 31. This situation is shown as an interference state $I_2$ in FIG. 9. Thus, the coil 21 must be installed carefully in order to avoid the interference state $I_2$ from occurring. In addition, even if care is taken to avoid the interference state $I_2$ from occurring, the coil 21 may interfere with the adjacent coil 20 because the coil 21 has to be moved toward the adjacent coil 20 by the height of the steps at the right-angled corners of the steps. As just described, in the related art, the work efficiency in installing the coil 21 is low because the coil 21 must be installed with care. In the structure that is shown in FIG. 8, the taper surfaces 36$_L$ are provided to prevent such situations from occurring. Thus, the work efficiency in installing the coil 21 is improved compared to the case of the related art that is shown in FIG. 9.

The invention claimed is:

1. A stator for a rotating electric machine, the stator comprising:
    a stator core including:
        an annular yoke; and
        teeth that protrude radially inward from the yoke, the teeth being arranged circumferentially, the teeth including a first tooth and a second tooth that is adjacent to the first tooth, a slot being defined between the first tooth and the second tooth;
    insulators, each of the insulators being located along outer peripheral wall surface of each of the teeth, each of the insulators including:
        first surfaces; and
        second surfaces that connect the first surfaces; and
    coils that are formed by concentrated winding, each of the coils being fitted on each of the teeth on which the insulator has been placed from a radially inner side,
    wherein the insulators are in contact with each of the coils that is placed on the outer periphery of each of the insulators only by contact between the first surfaces and inner peripheral surfaces of the coils,
    an angle between each of the first surfaces and each of the second surfaces is an obtuse angle, and
    each of the second surfaces is spaced apart from the inner peripheral surfaces of the coils in a direction perpendicular to the inner peripheral surfaces of the coils.

2. The stator according to claim 1,
    wherein the second surfaces of each of the insulators that is placed on the first tooth are parallel to outer peripheral surface of each of the coils that is placed on the second tooth.

3. The stator according to claim 1,
    wherein a first inclination angle is set with an inclination relative to a second inclination angle,
    the first inclination angle is an inclination angle between each of the first surfaces and each of the second surfaces of each of the insulators that is placed on the first tooth,
    the second inclination angle is an inclination angle between a center line of the first tooth and a center line of the second tooth, and
    the center line of the first tooth and the center line of the second tooth are lines that extend radially.

4. The stator according to claim 1,
    wherein the inner peripheral surface of one turn of each of the coils is partially in contact with the first surface and the other part of the inner peripheral surface is apart from the second surface.

* * * * *